United States Patent
MacBain et al.

(10) Patent No.: US 10,830,239 B2
(45) Date of Patent: Nov. 10, 2020

(54) REFRIGERATION COMPRESSOR FITTINGS

(71) Applicant: Carrier Corporation, Jupiter, FL (US)

(72) Inventors: Scott M. MacBain, Syracuse, NY (US); David M. Rockwell, Cicero, NY (US); Benjamin J. Blechman, Fayetteville, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 293 days.

(21) Appl. No.: 15/746,664

(22) PCT Filed: Aug. 11, 2016

(86) PCT No.: PCT/US2016/046516
§ 371 (c)(1),
(2) Date: Jan. 24, 2018

(87) PCT Pub. No.: WO2017/027688
PCT Pub. Date: Feb. 16, 2017

(65) Prior Publication Data
US 2018/0216619 A1  Aug. 2, 2018

Related U.S. Application Data

(60) Provisional application No. 62/203,858, filed on Aug. 11, 2015, provisional application No. 62/236,206, (Continued)

(51) Int. Cl.
*F04C 29/12* (2006.01)
*F04C 18/16* (2006.01)
(Continued)

(52) U.S. Cl.
CPC .............. *F04C 29/12* (2013.01); *F04C 18/16* (2013.01); *F04C 23/008* (2013.01); *F16L 17/04* (2013.01);
(Continued)

(58) Field of Classification Search
CPC .... F04C 18/16; F04C 29/12; F04C 2250/101; F04C 2230/60; F04C 2240/30; F16L 17/04; F25B 31/026
See application file for complete search history.

(56) References Cited

U.S. PATENT DOCUMENTS 3,871,800 A   3/1975 Slayton
4,934,482 A   6/1990 Herron et al.
(Continued)

FOREIGN PATENT DOCUMENTS

CA   2197361   10/1997
CN   1212333 A   3/1999
(Continued)

OTHER PUBLICATIONS

International Search Report and Written Opinion dated Oct. 13, 2016 for PCT Patent Application No. PCT/US2016/046459.
(Continued)

*Primary Examiner* — Kenneth J Hansen
(74) *Attorney, Agent, or Firm* — Bachman & LaPointe, P.C.

(57) ABSTRACT

A compressor (20) comprises: a housing assembly (22) having a plurality of ports including a suction port (24) and a discharge port (26); a male rotor (30) mounted for rotation about an axis (500); a female rotor (32) enmeshed with the male rotor and mounted in the housing for rotation about an axis (502) for drawing a flow from the suction port, compressing the flow, and discharging the compressed flow through the discharge port. The housing assembly comprises: a motor case (54); and a cover (60) bearing the suction port. The cover comprises a unitary piece forming: a mounting portion (63) mounted to an adjacent end (55) of the motor case, said adjacent end being large enough to pass
(Continued)

the motor; and a fitting portion (62) extending to a rim (66) at the suction port and bearing an external groove (200).

17 Claims, 7 Drawing Sheets

Related U.S. Application Data filed on Oct. 2, 2015, provisional application No. 62/342,666, filed on May 27, 2016.

(51) Int. Cl.
*F16L 17/04* (2006.01)
*F04C 23/00* (2006.01)

(52) U.S. Cl.
CPC ...... *F04C 2230/21* (2013.01); *F04C 2230/60* (2013.01); *F04C 2230/602* (2013.01); *F04C 2240/30* (2013.01); *F04C 2240/806* (2013.01)

(56) References Cited

U.S. PATENT DOCUMENTS

| | | | |
|---|---|---|---|
| 5,180,298 A | 1/1993 | DiRe | |
| 5,205,719 A | 4/1993 | Childs et al. | |
| 5,224,840 A | 7/1993 | Dreiman et al. | |
| 5,507,151 A | 4/1996 | Ring et al. | |
| 5,616,017 A | 4/1997 | Iizuka et al. | |
| 6,095,777 A | 8/2000 | Nishihata et al. | |
| 6,257,846 B1 | 7/2001 | Muramatsu et al. | |
| 6,360,555 B1 | 3/2002 | Li et al. | |
| 6,902,381 B2 | 6/2005 | Hur et al. | |
| 7,121,814 B2 | 10/2006 | Rockwell et al. | |
| 7,156,624 B2 | 1/2007 | Shoulders | |
| 7,568,898 B2 | 8/2009 | Shoulders | |
| 7,988,427 B2 | 8/2011 | Patrick | |
| 7,993,112 B2 | 8/2011 | Rockwell | |
| 8,016,071 B1 | 9/2011 | Martinus et al. | |
| 8,021,126 B2 | 9/2011 | Sishtla et al. | |
| 8,317,489 B2 | 11/2012 | Barth | |
| 8,496,446 B2 | 7/2013 | Lai | |
| 8,845,312 B2 | 9/2014 | Takaki | |
| 2003/0049146 A1 | 3/2003 | Dieterich | |
| 2005/0144976 A1 | 7/2005 | Sishtla | |
| 2006/0127235 A1 | 6/2006 | Shoulders | |
| 2006/0165543 A1 | 7/2006 | Fox et al. | |
| 2006/0239836 A1 | 10/2006 | Forster | |
| 2007/0264146 A1* | 11/2007 | Mosemann | F04C 18/084 418/201.1 |
| 2007/0269325 A1 | 11/2007 | Candio et al. | |
| 2008/0038127 A1* | 2/2008 | Yonemoto | F04C 18/16 417/423.8 |
| 2008/0219863 A1 | 9/2008 | Jung | |
| 2008/0284161 A1 | 11/2008 | Dole et al. | |
| 2010/0209280 A1 | 8/2010 | Flannigan et al. | |
| 2010/0218536 A1 | 9/2010 | Rockwell | |
| 2010/0263884 A1* | 10/2010 | Perkovich | A62C 35/68 169/43 |
| 2015/0004015 A1* | 1/2015 | Kienzle | F01N 1/083 417/312 |
| 2016/0097572 A1 | 4/2016 | Feller et al. | |

FOREIGN PATENT DOCUMENTS

| | | |
|---|---|---|
| CN | 1221088 A | 6/1999 |
| CN | 2002/053975 A1 | 7/2002 |
| CN | 1499080 A | 5/2004 |
| CN | 101072946 A | 11/2007 |
| CN | 201462139 U | 5/2010 |
| CN | 102878366 A | 1/2013 |
| CN | 203404544 U | 1/2014 |
| CN | 103821713 A | 5/2014 |
| CN | 203822630 U | 9/2014 |
| DE | 10011023 A1 | 9/2001 |
| DE | 202005001600 U1 | 4/2005 |
| DE | 102013106344 A1 | 12/2014 |
| EP | 0542169 A1 | 5/1993 |
| EP | 0926414 A2 | 6/1999 |
| FR | 1339407 A | 10/1963 |
| JP | 57129286 A | 8/1982 |
| JP | H01237389 A | 9/1989 |
| JP | 07332267 A | 12/1995 |
| JP | 08338386 A | 12/1996 |
| JP | 2003184767 A | 7/2003 |
| RU | 2435985 C2 | 12/2011 |
| RU | 2547211 C2 | 4/2015 |
| WO | 01/66946 A1 | 9/2001 |
| WO | 02/053917 A1 | 7/2002 |
| WO | 2008/045084 A1 | 4/2008 |
| WO | 2011/152915 A2 | 12/2011 |
| WO | 2015/006081 A2 | 1/2015 |

OTHER PUBLICATIONS

Chinese Office Action dated Jan. 2, 2019 for Chinese Patent Application No. 201680047232.X.
European Office Action dated Feb. 20, 2019 for European Patent Application No. 16754377.6.
Fang Danqun, Aerodynamic Noise and Muffler, Aug. 31, 1978, pp. 140-146, Science Press, Beijing, China.
Chinese Office Action dated Nov. 29, 2018 for Chinese Patent Application No. 201680041008.X.
International Search Report and Written Opinion dated Oct. 26, 2016 for PCT Patent Application No. PCT/US2016/046457.
Russian Office Action dated Dec. 11, 2019 for Russian Patent Application No. 2018100095.
Russian Office Action dated Dec. 17, 2019 for Russian Patent Application No. 2018103545.
Anatomy of a Grooved Pipe Joint, Jan. 2010, Victaulic, Easton, Pennsylvania.
Seal Selection Guide Elastometric Seal Construction, Mar. 2016, Victaulic, Easton, Pennsylvania.
Aquaforce 30XW150-400 Water-Cooled Liquid Chillers, Installation Instructions, Jul. 2012, Carrier Corporation, Jupiter, Florida.
International Search Report and Written Opinion dated Oct. 21, 2016, for PCT Patent Application No. PCT/US2016/046516.
High Flow Compressor Outlet Pipe for Evo X Turbo, Jul. 23, 2014, BC, Canada, retrieved from Internet Mar. 22, 2018 https://www.exoticspeed.com/products/high-flow-compressor-outlet-pipe-for-evo-x-turbo, Exotic Speed.
Chinese Office Action dated Mar. 18, 2020 for Chinese Patent Application No. 201680047232.X.

* cited by examiner

REFRIGERATION COMPRESSOR FITTINGS

CROSS-REFERENCE TO RELATED APPLICATIONS

Benefit is claimed of U.S. Patent Application No. 62/342,666, filed May 27, 2016, and entitled "Refrigeration Compressor Fittings", and U.S. Patent Application Ser. No. 62/236,206, filed Oct. 2, 2015, and entitled "Screw Compressor Resonator Arrays", and U.S. Patent Application No. 62/203,858, filed Aug. 11, 2015, and entitled "Screw Compressor Economizer Plenum for Pulsation Reduction", the disclosures of which are incorporated by reference herein in their entireties as if set forth at length.

BACKGROUND

The disclosure relates to compressors. More particularly, the disclosure relates to housing construction of screw compressors.

Screw compressors are often used in chiller systems. In a common compressor configuration, a motor directly drives one of the screws to, in turn, drive one or two other screws. The motor is held in a motor compartment of the compressor housing or case. In an exemplary semi-hermetic compressor, a compressor inlet opens to the motor compartment so that the incoming refrigerant may cool the motor.

In a typical chiller installation, an integral assembly unit includes one or two screw compressors mounted atop a water-cooled condenser. The chiller or evaporator unit may also be part of this assembly.

Typically, the compressor will include an inlet cover with a fitting which may, in turn, be connected to a fitting of the refrigerant suction line. In one situation, the compressor fitting is an internally-threaded fitting to which a grooved fitting adaptor is mated.

SUMMARY

One aspect of the disclosure involves a compressor comprising a housing assembly having a plurality of ports including a suction port and a discharge port. A male rotor is mounted for rotation about an axis. A female rotor is enmeshed with the male rotor and mounted in the housing for rotation about an axis for drawing a flow from the suction port, compressing the flow, and discharging the compressed flow through the discharge port. The housing assembly comprises: a motor case; and a cover bearing the suction port. The cover comprises a unitary piece forming: a mounting portion mounted to an adjacent end of the motor case, said adjacent end being large enough to pass the motor; and a fitting portion extending to a rim at the suction port and bearing an external groove In one or more embodiments of any of the foregoing embodiments, a ratio of an outer diameter D at the fitting portion to a length L of the cover is 0.9:1 to 1.7:1.

In one or more embodiments of any of the foregoing embodiments, a ratio of an outer diameter at the fitting portion to a maximum transverse dimension of the cover is 1:3 to 1:6.

In one or more embodiments of any of the foregoing embodiments, the cover comprises a casting.

In one or more embodiments of any of the foregoing embodiments, the cover consists essentially of grey cast iron.

In one or more embodiments of any of the foregoing embodiments, the cover is secured to the motor case via an array of at least 8 fasteners.

Another aspect of the disclosure involves a vapor compression system comprising the compressor, and further comprising: a heat rejection heat exchanger; a heat absorption heat exchanger; and a flowpath from the discharge port sequentially through the heat rejection heat exchanger and heat absorption heat exchanger and returning to the suction port.

In one or more embodiments of any of the foregoing embodiments, the vapor compression system is a chiller.

In one or more embodiments of any of the foregoing embodiments, the vapor compression system further comprises a clamp having one flange accommodated in the groove and another flange accommodated in a groove of a suction line.

In one or more embodiments of any of the foregoing embodiments the clamp comprises first and second segments, each having an arcuate center portion and first and second terminal ears.

In one or more embodiments of any of the foregoing embodiments: a first fastener connects the first segment first terminal ear to the second segment second terminal ear; and a second fastener connects the first segment second terminal ear to the second segment first terminal ear.

In one or more embodiments of any of the foregoing embodiments, a method for operating the compressor or vapor compression system comprises: driving rotation of the male rotor and the female rotor to draw the flow from the suction port, compress the flow, and discharge the compressed flow through the discharge port.

In one or more embodiments of any of the foregoing embodiments, a method for assembling or disassembling the compressor or vapor compression system comprises passing the motor through said adjacent end.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
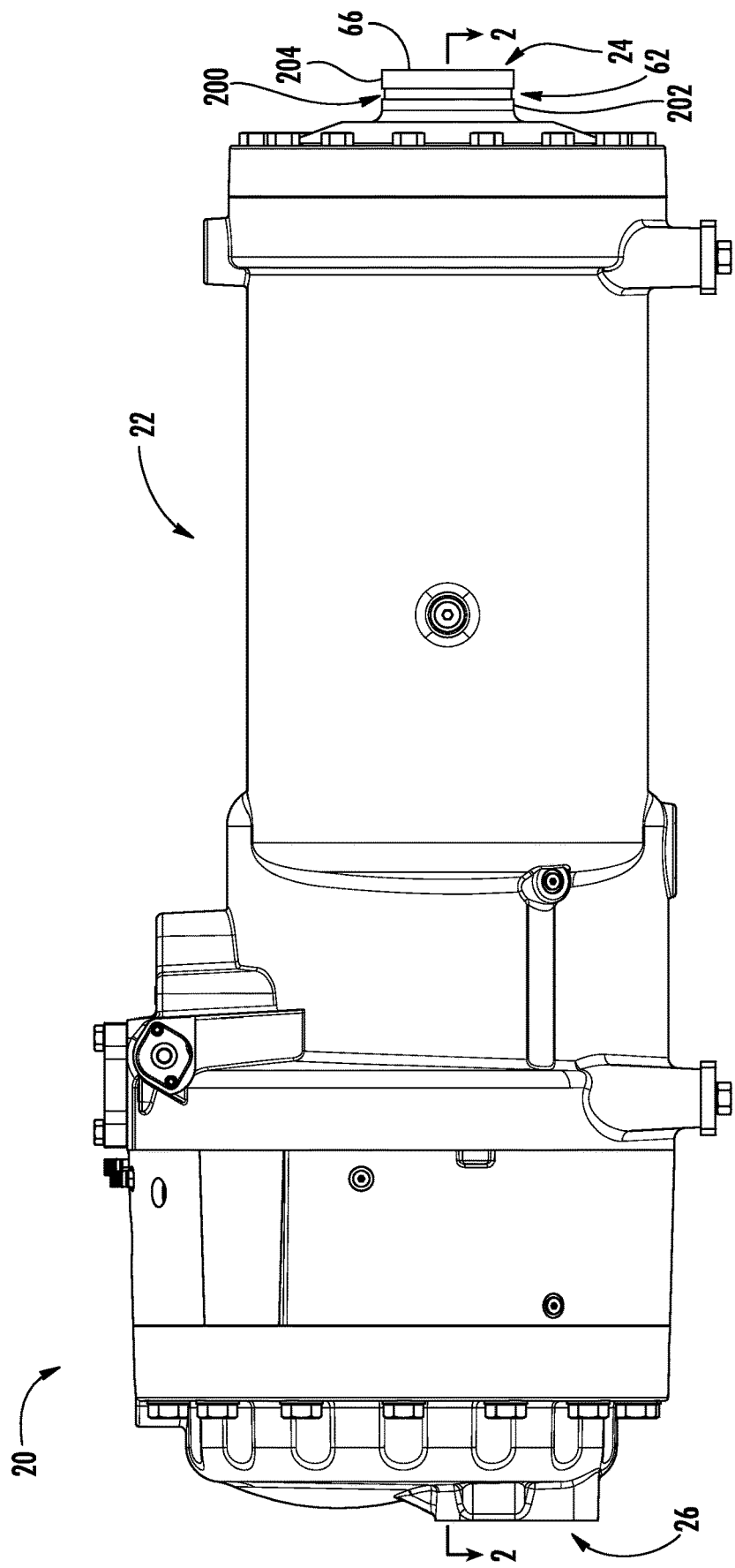
FIG. 1 is a side view of a screw compressor.

FIG. 1 shows a screw compressor 20 having a housing or case (case assembly) 22 including an inlet or suction port 24 and an outlet or discharge port 26. The exemplary suction port 24 and discharge port 26 are axial ports (facing in opposite directions parallel to rotor axes). The case assembly comprises several main pieces which may be formed of cast or machined alloy.

Figure 2:
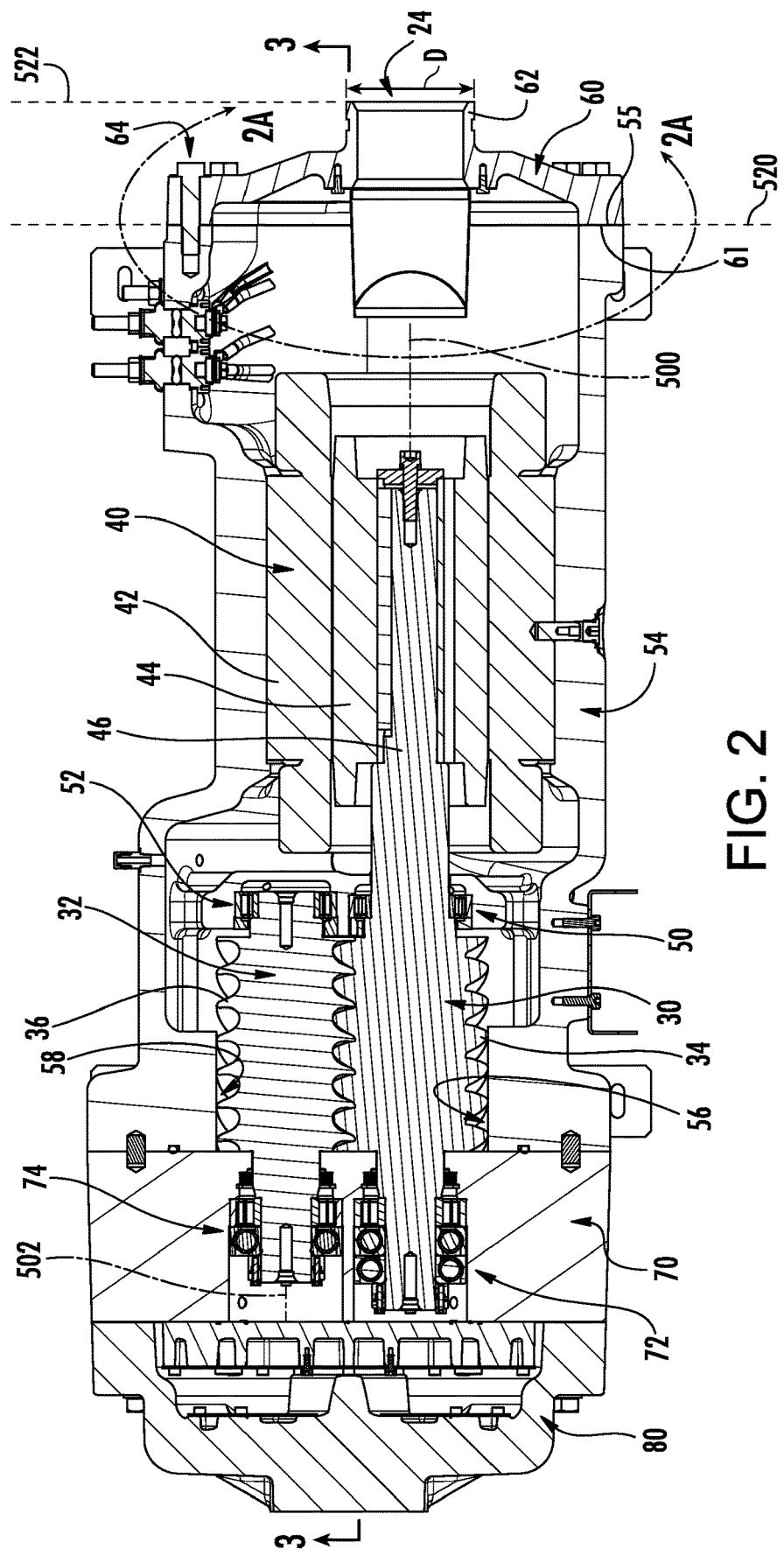
FIG. 2 is a central horizontal sectional view of the compressor taken along line 2-2 of FIG. 1.

FIG. 2 shows an exemplary compressor as being a screw compressor, more particularly, a two-rotor direct drive semi-hermetic screw compressor. The exemplary screws are a respective male rotor 30 and female rotor 32. The male rotor has a lobed working portion 34. The female rotor has a lobed working portion 36 enmeshed with the male rotor working portion 34. In the exemplary embodiment, the male rotor is driven for rotation about an axis 500 by a motor 40 having a stator 42 and a rotor 44. The exemplary drive is direct drive with an upstream shaft 46 of the male rotor mounted in the rotor 44. The driving of the male rotor causes the cooperation between lobes to, in turn, drive rotation of the female rotor about its axis 502.

Figure 2A:
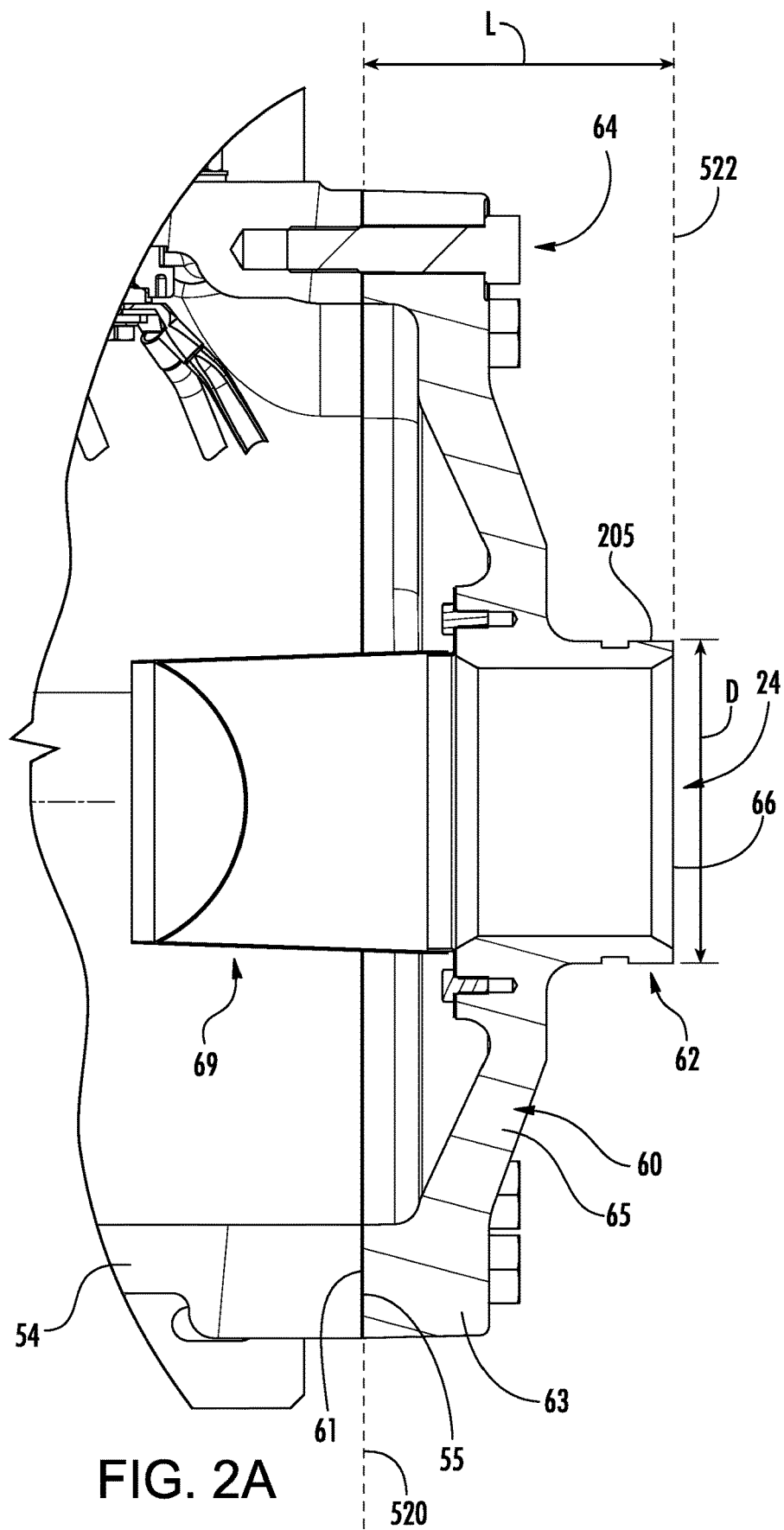
FIG. 2A is an enlarged view of an inlet end of the compressor of FIG. 2.

The exemplary rotors are supported for rotation about their respective axes by one or more bearings (e.g., rolling element bearings) along shaft portions protruding from opposite ends of each such rotor working portion. In an exemplary embodiment, upstream end bearings 50 and 52, respectively, are mounted in associated compartments in a main casting (main case member) 54 of the case assembly which forms a rotor case and the body of a motor case. The rotor case portion defines respective bores 56 and 58 accommodating the lobed working portions. At an upstream end of the motor case portion, a motor case cover or endplate 60 encloses the motor case and provides the inlet port such as via an integral fitting 62. The exemplary cover 60 (FIG. 2A) is secured to the upstream end of the main case member 54 via a threaded fastener (screw/bolt) 64 circle (e.g., at least 8 fasteners, more specifically, 15 to 40 or 20 to 35) extending through a flange of the cover and into threaded bores of the main case member. FIG. 2A shows a mounting face 61 of a mounting portion 63 of the cover mated to the inlet/suction end face 55 of the case member 54. A web 65 extends inward and outward/upstream from the mounting portion 63 to the fitting 62. FIG. 2A also shows a mating plane 520 between the cover and case member 54. There may be a gasket (not shown) along the mating plane. The case opening at the end face 55 is large enough to pass the motor.

FIG. 2A also shows an inlet filter 69 fastened (e.g., screwed) to the inboard face of the cover.

FIG. 2A also shows a plane 522 of a rim surface or end 66 of the fitting. As is discussed further below, the fitting is a grooved fitting for receiving an associated coupling joining the fitting to a similarly grooved end portion of a suction line.

Figure 3:
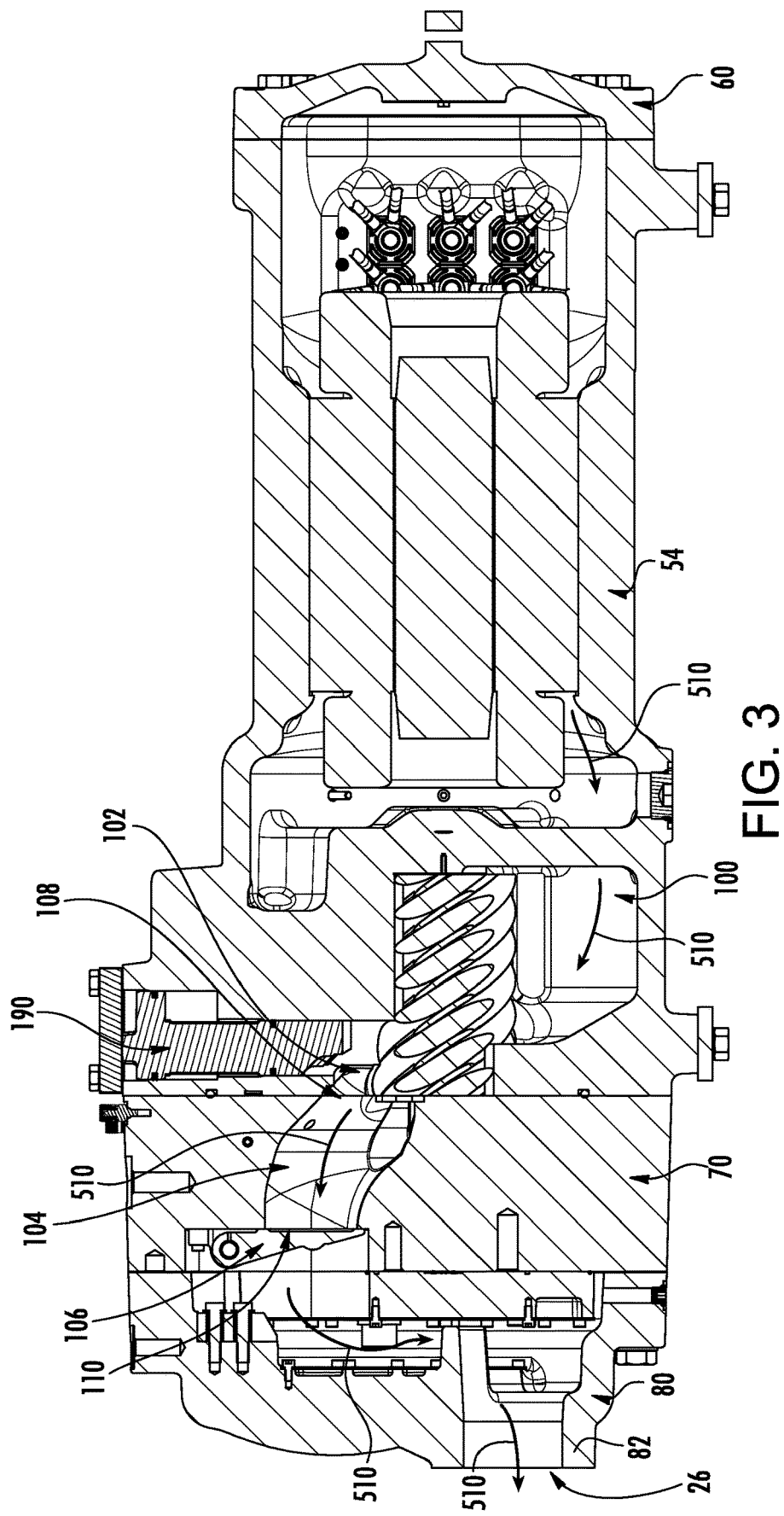
FIG. 3 is a longitudinal vertical sectional view of the compressor taken along line 3-3 of FIG. 2.

At the downstream end of the main case member 54, the case assembly includes a separate bearing case member (discharge end bearing case) 70 which has bearing compartments in which the respective discharge end bearings 72 and 74 of the male rotor and female rotor are mounted. A discharge case (cover or endplate) 80 may cover the bearing case 70 and may provide the discharge port such as via a fitting 82 (FIG. 3). The discharge cover 80 may be secured such as via a threaded fastener circle. In one exemplary implementation, the fasteners extend through the bearing case to the main case member 54 downstream end.

In operation, the exemplary flowpath 510 through the compressor passes from the suction port 24 through the motor case (around and/or through the motor), into a suction plenum 100 (FIG. 3) of the rotor case and then through the enmeshed rotors wherein flow is compressed. The flowpath passes into a discharge plenum 102 portion of the rotor case and then through a discharge passageway 104 of the bearing case which forms an extension of the discharge plenum. A discharge valve 106 (e.g., a spring-loaded flapper valve) may control flow through the discharge plenum to prevent backflow. In the exemplary embodiment, the passageway 104 radially diverges from an inlet end 108 to an outlet end 110 so that the outlet end is at a relatively outboard location in the bearing case 70. This location is substantially offset from the discharge port 26 (e.g., approximately diametrically offset with the exemplary nominal circular planform of the bearing case and discharge cover). In the exemplary embodiment, the end 110 is at the twelve o'clock position looking upstream while the discharge port 26 is at the six o'clock position. This offset causes the flowpath to need to proceed transversely downward from the end 110 and valve 106 to get to the discharge port. This offset breaks line-of-sight between the discharge plenum and the discharge port to help dissipate pulsations generated by the opening of compression pockets to the discharge plenum. FIG. 3 also shows a Vi piston 190.

Figure 4:
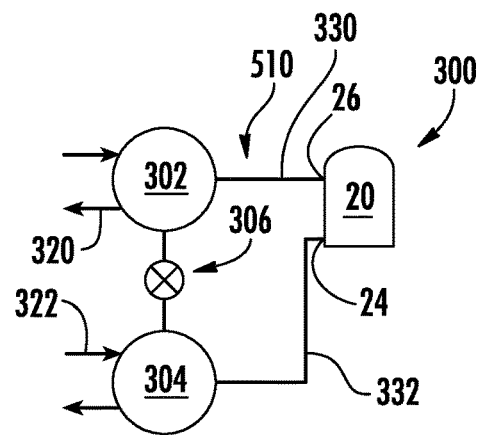
FIG. 4 is a schematic view of a vapor compression system including the compressor.

FIG. 4 shows a vapor compression system 300 including the compressor 20. The exemplary vapor compression system 300 is a basic chiller wherein a refrigerant flowpath 510 from the compressor proceeds sequentially through a condenser 302 and a cooler 304 prior to returning to the compressor. Exemplary coolers may serve as evaporators to absorb heat from and cool a flow 322 of water or other heat transfer liquid for various heating ventilation and air conditioning (HVAC) purposes. Similarly, the condenser rejects heat to a flow 320 of air or water. FIG. 4 also shows an expansion device 306 such as an electronic expansion valve. More complex vapor compression systems may be implemented.

Additionally, various different compressor configurations may be used including compressors with economizer ports, three-rotor compressors, and the like. Although the exemplary compressor is shown having a Vi piston 190 (FIG. 3), other unloading devices, or none at all, may be present.

Figure 5:
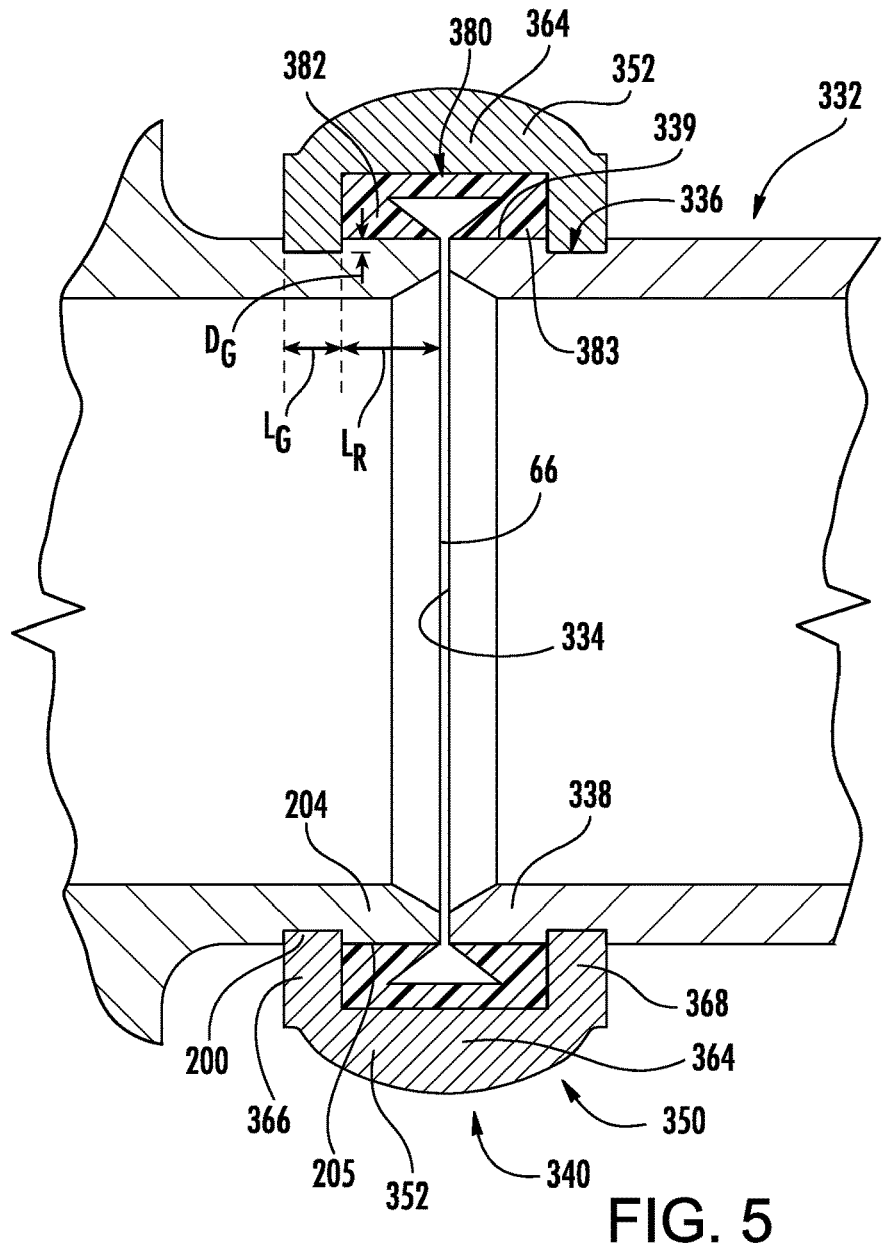
FIG. 5 is sectional view of an inlet connection.
Figure 6:
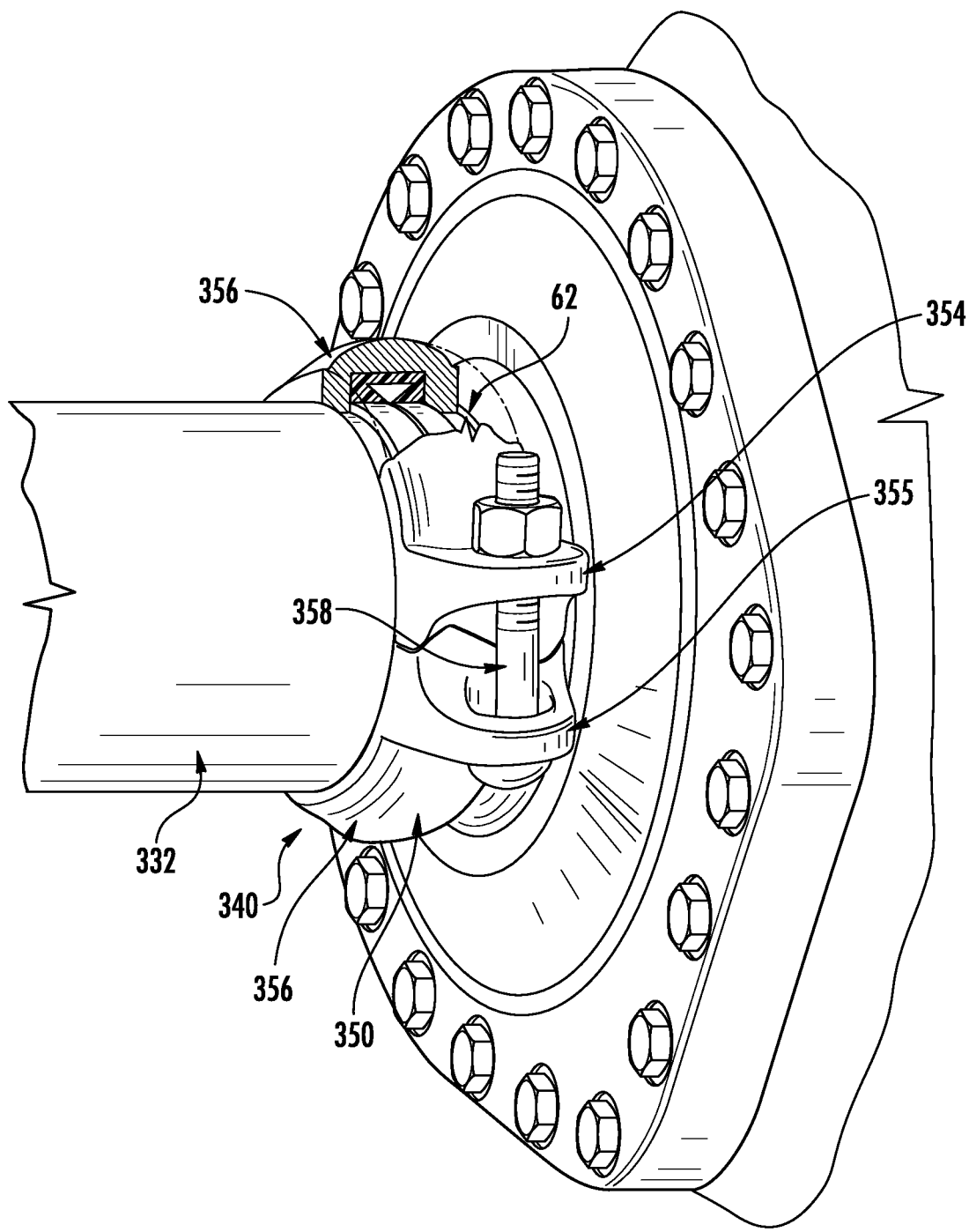
FIG. 6 view of the inlet connection.

FIG. 4 shows a discharge line 330 and a suction line 332. FIGS. 5 and 6 show the suction line 332 coupled to the fitting 62 by a coupling 340.

The exemplary coupling 340 is of a grooved coupling system such as are produced by Victaulic Company of Easton, Pa. One particular coupling is the Style 177 QuickVic™ flexible coupling by Victaulic Company. The grooved coupling system features grooves 200, 336 (FIG. 5) on the inlet fitting and the suction line recessed from respective rims 66, 334 by terminal portions 204, 338 having OD surfaces 205, 339. FIG. 1 shows portion 202 of the fitting on the opposite side of the groove at the same diameter as the terminal portion.

Such couplings comprise a clamp having a metallic body 350 having a pair of members 352 each extending around about half the pipe circumference. The members have a pair of terminal ears 354, 355 (FIG. 6) at ends of a central arcuate portion 356 receiving an associated screw, bolt, or other fastener 358 to mount to the associated ear of the other member. The fasteners may be tightened to engage the clamp to the members being joined.

Each of the members has a U-channel-shaped cross-section with a circumferential web/band 364 portion and a pair of end flanges 366, 368 extending radially inward to be captured in the respective associated groove. A seal 380 is captured within the channel and has respective lips 382, 383 radially compressed into engagement with the associated terminal portion OD surface 205, 339 of the fitting and pipe, respectively.

In assembly, the gasket may be slid over one of the fitting and suction line and the other then brought into close facing proximity. The gasket may then be slid axially (if needed) so that its lips engage the respective terminal portions along the outer diameter surface thereof. The clamp body members 352 may then be assembled over the joint so that their flanges are received in the associated grooves. The fasteners 358 may be installed and tightened to tighten the clamp into engagement with the joined members. FIG. 2A shows a characteristic fitting diameter D as the diameter of the OD surface 205. FIG. 5 shows a groove depth DG below this diameter and a groove length LG. The groove is recessed from the rim 66 by a recess length $L_R$. A cover length L (FIG. 2A) is a distance between the face 61 and the rim 66.

A ratio of the outer diameter D at the fitting portion to the length L of the cover is 0.9:1 to 1.7:1, more specifically 0.9:1 to 1.5:1. As a further characteristic of the large transverse dimension effective to allow the mating case portion to pass the motor, a ratio of D to a maximum transverse dimension of the cover is 1:3 or greater, more specifically, 1:3 to 1:6 or 1:3.5 to 1:5.

In an exemplary reengineering from a baseline compressor, the baseline compressor may have an inlet cover lacking the grooved fitting but having a small fitting (e.g., at opposite sides of an inlet opening there may be internally threaded bores for fastening a complementary connector). In some implementations, this complementary connector may be a grooved connector that adds additional length. The use of an integral grooved fitting may reduce overall compressor length in such a situation. The cover may be manufactured by casting (e.g., of grey cast iron) followed by machining. Exemplary machining involves milling the mating face, boring/counterboring the fastener holes and finish machining around the suction port. Otherwise, construction details and techniques may be similar to those of the baseline compressor.

The compressor and chiller system may be made using otherwise conventional or yet-developed materials and techniques.

In various implementations, the use of the integral fitting may contribute to packaging efficiency. Also, labor to install the compressor to the associated chiller may be reduced relative to compressors shipped without the grooved coupling fitting. As an example of packaging efficiency, overall compressor length is often an issue. In an example of a water-cooled chiller system, the compressor is mounted atop the evaporator vessel which is mounted atop or partially aside the condenser vessel. Efficient operation of the evaporator dictates optimal longitudinal positioning of the evaporator refrigerant outlet. If that outlet (radially on the vessel) connects to the compressor in the simplest way (a 90° elbow suction line), one end of the range of possible longitudinal positions of the compressor is dictated. By reducing overall compressor length (starting at the coupling) one reduces any protrusion of the discharge end (or other downstream components) beyond the associated end of the evaporator. This may also be particularly significant in systems having two compressors end-to-end atop the evaporator.

Figure 7:
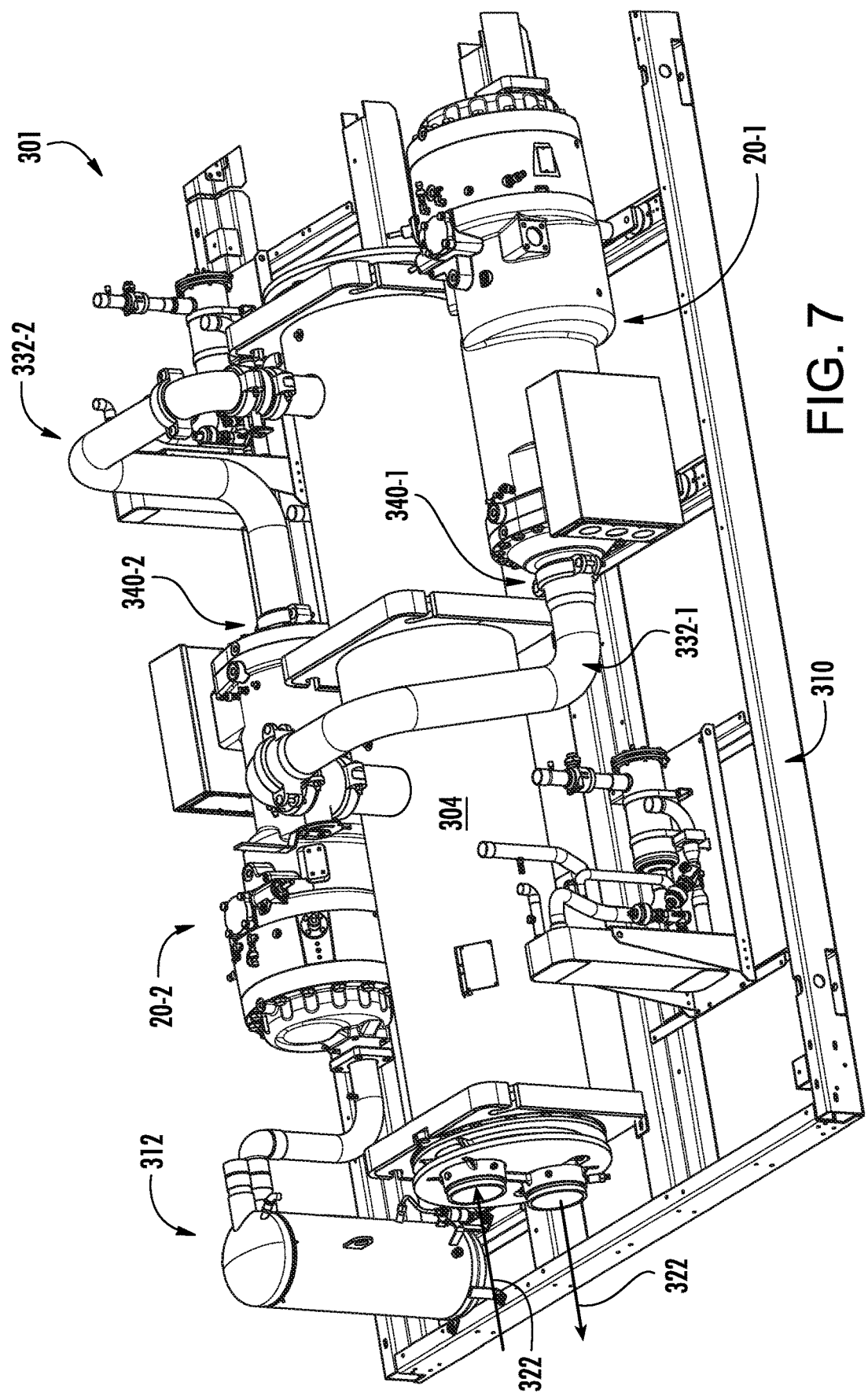
FIG. 7 is a partial, partially cut away, view of an air-cooled chiller system.

FIG. 7 shows an example of an air-cooled chiller system 301. The evaporator 304 and a pair of compressors 20-1 and 20-2 are mounted to a base 310 (shown cut away at the right). A condenser (not shown) is an air-cooled coil (e.g., V-unit with electric fan) mounted in a frame above the evaporator and compressors. Each compressor discharges to an associated separator 312 (only the separator associated with the compressor 20-2 shown). It is seen that the discharge end of the compressor 20-1 and its associated separator (not shown) will protrude well beyond the adjacent end of the evaporator. Thus, compressor length can potentially mandate an overall length greater than that dictated by the evaporator alone.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A vapor compression system (300; 301) comprising:
   a compressor (20) comprising:
      a housing assembly (22) having a plurality of ports including a suction port (24) and a discharge port (26);
      a motor (40) within the housing assembly;
      a male rotor (30) mounted for rotation about an axis (500); and
      a female rotor (32) enmeshed with the male rotor and mounted in the housing assembly for rotation about an axis (502) for drawing a flow from the suction port, compressing the flow, and discharging the compressed flow through the discharge port;
   a clamp (350);
   a heat rejection heat exchanger (302);
   a heat absorption heat exchanger (304); and
   a flowpath from the discharge port sequentially through the heat rejection heat exchanger and the heat absorption heat exchanger and returning to the suction port,
   wherein:
      the housing assembly comprises:
         a motor case (54); and
         a cover (60) bearing the suction port;
      the cover comprises a unitary piece forming:
         a mounting portion (63) mounted to an adjacent end (55) of the motor case, said adjacent end having an opening large enough to pass the motor; and
         a fitting portion (62) extending to a rim (66) at the suction port and bearing an external groove (200); and
      the clamp has one flange (366) accommodated in the external groove and another flange (368) accommodated in a groove (336) of a suction line (332; 332-1, 332-2).

2. The vapor compression system of claim 1 wherein:
   a ratio of an outer diameter D at the fitting portion to a length L of the cover is 0.9:1 to 1.7:1.

3. The vapor compression system of claim 2 wherein:
   a ratio of an outer diameter at the fitting portion to a maximum transverse dimension of the cover is 1:3 to 1:6.

4. The vapor compression system of claim 3 wherein:
   the cover comprises a casting.

5. The vapor compression system of claim 4 wherein:
   the cover consists essentially of grey cast iron.

6. The vapor compression system of claim 5 wherein:
the cover is secured to the motor case via an array of at least 8 fasteners.

7. The vapor compression system of claim 1 being a chiller.

8. The vapor compression system of claim 7 wherein:
the clamp comprises first and second segments, each having an arcuate center portion and first (354) and second (355) terminal ears.

9. The vapor compression system of claim 8 wherein:
a first fastener (358) connects the first segment first terminal ear to the second segment second terminal ear; and
a second fastener (358) connects the first segment second terminal ear to the second segment first terminal ear.

10. The vapor compression system of claim 1 wherein:
the clamp comprises first and second segments, each having an arcuate center portion and first (354) and second (355) terminal ears.

11. The vapor compression system of claim 10 wherein:
a first fastener (358) connects the first segment first terminal ear to the second segment second terminal ear; and
a second fastener (358) connects the first segment second terminal ear to the second segment first terminal ear.

12. The compressor of claim 1 wherein:
a ratio of an outer diameter at the fitting portion to a maximum transverse dimension of the cover is 1:3 to 1:6.

13. The compressor of claim 1 wherein:
the cover comprises a casting.

14. The compressor of claim 1 wherein:
the cover consists essentially of grey cast iron.

15. The compressor of claim 1 wherein:
the cover is secured to the motor case via an array of at least 8 fasteners.

16. A method for operating the vapor compression system of claim 1, the method comprising:
driving rotation of the male rotor and the female rotor to draw the flow from the suction port, compress the flow, and discharge the compressed flow through the discharge port.

17. A method for assembling or disassembling the vapor compression system of claim 1, the method comprising:
passing the motor through the opening of said adjacent end (55).

* * * * *